(12) United States Patent
Miller et al.

(10) Patent No.: US 12,017,913 B1
(45) Date of Patent: *Jun. 25, 2024

(54) PROCESS FOR USING WASTE HEAT AND CARBON DIOXIDE FROM THE PRODUCTION OF LOW, NEUTRAL AND/OR NEGATIVE CARBON INTENSITY HYDROGEN

(71) Applicant: Kraken Technology Holdings, LLC, Houston, TX (US)

(72) Inventors: Christopher Michael Miller, Richmond, TX (US); Anna Louise Buckley, Houston, TX (US); Byron Gladus Best, III, Katy, TX (US); Bengt Arne Jarlsjo, Houston, TX (US); Daniel Joseph Shapiro, Houston, TX (US)

(73) Assignee: Kraken Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,508

(22) Filed: Aug. 17, 2023

Related U.S. Application Data

(63) Continuation of application No. 18/118,887, filed on Mar. 8, 2023, and a continuation of application No.
(Continued)

(51) Int. Cl.
*C01B 3/02* (2006.01)
*C01C 1/04* (2006.01)

(52) U.S. Cl.
CPC .............. *C01B 3/025* (2013.01); *C01C 1/04* (2013.01); *C01B 2203/0205* (2013.01);
(Continued)

(58) Field of Classification Search
CPC ............ C01B 3/025; C01B 2203/0205; C01B 2203/0283; C01B 2203/0475;
(Continued)

(56) References Cited

U.S. PATENT DOCUMENTS

2004/0265651 A1* 12/2004 Steinberg ............... C01B 3/24
429/495
2006/0207178 A1* 9/2006 Hsu ......................... B01J 8/062
48/127.9
2022/0119269 A1 4/2022 Huckman et al.

FOREIGN PATENT DOCUMENTS

DE 102009018126 A1 * 10/2010 ............... C10L 3/08
FR 3120317 A1 9/2022
(Continued)

OTHER PUBLICATIONS

Eliasson, A., Fahrman, E., Biermann, M., Normann, F., Harvey, S., "Efficient heat integration of industrial CO2 capture and district heating supply", International Journal of Greenhouse Gas Control, May 6, 2022, 13 pages, vol. 118.
(Continued)

*Primary Examiner* — Joseph D Anthony
(74) *Attorney, Agent, or Firm* — Spencer Fane, LLP

(57) ABSTRACT

A method for providing energy to commercial or industrial operations, such as greenhouses and algae farms, is provided. The method includes the step of recovering waste heat from a hydrogen production process, wherein the hydrogen product has a carbon intensity preferably less than about 1.0 kg $CO_2$e/kg $H_2$, more preferably less than about 0.45 kg $CO_2$e/kg $H_2$, and most preferably less than about 0.0 kg $CO_2$e/kg $H_2$. The hydrogen is preferably produced by converting a hydrocarbon feedstock to hydrogen through a reforming process, wherein at least some, and preferably substantially all, of the required energy for the hydrogen production process is provided from a biomass power plant.
(Continued)

The method also includes the steps of processing one or more gas streams containing carbon dioxide from the biomass power plant and the hydrogen production process in one or more carbon capture unit to reduce $CO_2e$ emissions, and converting at least some of the waste heat to thermal energy for use in the commercial or industrial operations. The method further comprises the step of providing at least some, and preferably substantially all of the required energy for the commercial or industrial operations from the biomass power plant.

12 Claims, 3 Drawing Sheets

Related U.S. Application Data

18/118,553, filed on Mar. 7, 2023, and a continuation of application No. 18/117,606, filed on Mar. 6, 2023.

(60) Provisional application No. 63/482,430, filed on Jan. 31, 2023.

(52) U.S. Cl.
CPC ............ *C01B 2203/0283* (2013.01); *C01B 2203/0475* (2013.01); *C01B 2203/068* (2013.01); *C01B 2203/0811* (2013.01); *C01B 2203/1241* (2013.01); *C01B 2203/84* (2013.01); *C01B 2203/86* (2013.01)

(58) Field of Classification Search
CPC ........ C01B 2203/068; C01B 2203/0811; C01B 2203/1241; C01B 2203/84; C01B 2203/86; C01C 1/04
See application file for complete search history.

(56) References Cited

FOREIGN PATENT DOCUMENTS

| WO | 2021110757 A1 | 6/2021 | |
|---|---|---|---|
| WO | WO-2021189137 A1 * | 9/2021 | ............ B01D 53/62 |
| WO | 2022217365 A1 | 10/2022 | |

OTHER PUBLICATIONS

Antonini, C., Treyer, K., Streb, A., Spek, M.V.D., Bauer, C., Mazzotti, M., "Hydrogen production from natural gas and biomethane with carbon capture and storage—A techno-environmental analysis", Sustainable Energy & Fuels, Jan. 2020, pp. 2967-2986, vol. 4.
International Search Report and Written Opinion of the International Searching Authority for International Patent Application No. PCT/US2023/072688, dated Mar. 5, 2024, European Patent Office.

* cited by examiner

PROCESS FOR USING WASTE HEAT AND CARBON DIOXIDE FROM THE PRODUCTION OF LOW, NEUTRAL AND/OR NEGATIVE CARBON INTENSITY HYDROGEN

CROSS-REFERENCE TO RELATED APPLICATION

This application claims the benefit of U.S. Prov. App. Nos. 63/482,430 (filed Jan. 31, 2023) and U.S. application Ser. No. 18/117,606 (filed Mar. 6, 2023), Ser. No. 18/118,553 (filed Mar. 7, 2023), and Ser. No. 18/118,887 (filed Mar. 8, 2023), all of which are incorporated by reference herein in their entireties.

BACKGROUND

The present invention relates to a method and process for the beneficial use of waste heat and/or carbon dioxide produced during the production of low, neutral and/or negative carbon intensity hydrogen.

Many industrial applications that generate waste heat use either cooling water or air-cooled heat exchangers to cool process fluids. In these applications, the heat generated by the system is typically rejected to the atmosphere by evaporative cooling towers or fans. This waste heat could be captured for beneficial use to optimize the heat integration of the facility and/or for external beneficial purposes.

As the global economy drives towards environmental, social, and governance (ESG) solutions for industrial facilities, waste heat will be captured and utilized for beneficial use. ESG solutions will also drive industrial facilities to capture carbon dioxide, which can be repurposed for beneficial use or permanently sequestered.

Low, neutral, and/or negative carbon intensity hydrogen produced through reforming a hydrocarbon feedstock with biomass energy, as is described in co-owned U.S. application Ser. No. 18/117,606, generates several waste heat streams that can be harnessed and repurposed for beneficial uses including heat integration with industrial processes, including greenhouses.

Greenhouses provide a sheltered, artificial environment to facilitate the growth of plants in a non-ideal climate. Even in temperate climates, greenhouses require artificial heating to maintain temperatures above freezing and provide an optimal temperature for plant growth. Most of the heat is lost from conduction of the heat from the warm greenhouse interior through the greenhouse glazing to the colder exterior. Heat can also be lost from infiltration of cold air through cracks or holes in the exterior of the greenhouse, including doors and ventilation systems. Radiation, the transfer of heat from a warm greenhouse to a colder exterior environment without direct contact, can also lead to greenhouse heat loss.

To overcome heat loss to the environment and maintain an ideal temperature, greenhouses are equipped with central and/or local heating systems. Typically, central heating systems consist of a boiler and a distribution system that supplies thermal energy, as either hot water and/or steam, to the greenhouse. Local heating systems, either vented or unvented unit heaters, transfer heat from the combustion of hydrocarbon gases to provide heating to the greenhouse.

It is also well known to use carbon dioxide beneficially to supplement or enrich the $CO_2$ concentration of the air inside greenhouses. $CO_2$-enriched greenhouses provide numerous benefits including improved yields, earlier flowering, increased number and size of flowers, increased stem/leaf size and thickness, and reduced number of days to maturation. The saturation point for most plants is reached at concentrations of 1,000-1,200 ppm of $CO_2$, whereas the saturation point for most seedlings is reached at concentrations of 800-1,000 ppm of $CO_2$. For comparison purposes, the atmospheric $CO_2$ concentration is approximately 420 ppm. By supplementing the greenhouse air with captured $CO_2$, greenhouses can produce better quality and larger quantity of fruits, vegetables, and/or flowers as compared to greenhouses without supplemental $CO_2$.

Carbon dioxide can also be used beneficially for aquacultural purposes, specifically to enrich the $CO_2$ concentration of the sparging air required for algae farms. Depending on the type of algae and/or microalgae, enhanced growth occurs at concentrations of 0.5-2 vol % $CO_2$. By enriching the sparging air, algae can be produced in larger quantities for use in fertilizers, animal food, food supplements, and/or biofuels.

To support ESG and climate initiative goals, carbon dioxide may be captured and either utilized in beneficial applications or sequestered in geological formations. In the production of low, neutral, and/or negative carbon intensity hydrogen, captured carbon dioxide from the hydrogen production facility and/or the integrated biomass power plant can be used beneficially, including for use in greenhouses and/or algae farms (e.g. aquaculture).

The present invention provides a method and process for the beneficial use of waste heat and/or carbon dioxide produced during the production of low, neutral and/or negative carbon intensity hydrogen. Waste heat from a nearby hydrogen production facility and/or the integrated biomass power plant can be utilized to provide thermal energy, in the form of hot water and/or steam, to nearby greenhouses instead of a dedicated central or local heating system to maintain temperatures above freezing and provide an optimal temperature for plant growth. The carbon neutral or carbon negative electricity produced from the biomass power plant for the production of low, neutral, and/or negative carbon intensity hydrogen can also be used to provide power to the greenhouse directly. Carbon neutral or carbon negative electricity can be used to power growth lights, which are designed to stimulate photosynthesis and prolong exposure in the absence of natural sunlight, enhancing plant growth. Captured carbon dioxide from the production of low, neutral, and/or negative carbon intensity hydrogen can be used beneficially to promote growth of plants and algae.

SUMMARY OF THE INVENTION

A method for providing energy to commercial or industrial operations is provided. The method includes the step of recovering waste heat from a hydrogen production process, wherein the hydrogen product has a carbon intensity preferably less than about 1.0 kg $CO_2e$/kg $H_2$, more preferably less than about 0.45 kg $CO_2e$/kg $H_2$, and most preferably less than about 0.0 kg $CO_2e$/kg $H_2$. The hydrogen is preferably produced by converting a hydrocarbon feedstock to hydrogen through a reforming process, wherein at least some, and preferably substantially all, of the required energy for the hydrogen production process is provided from a biomass power plant. The energy produced by the biomass power plant is selected from one or more of:

(a) electricity generated from work produced by a Rankine cycle, Brayton cycle, or integrated gasification combine cycle;

(b) steam that can be used as process steam in the hydrogen production process;
(c) steam that can be used as thermal energy; or
(d) steam that can be used to power a mechanical drive.

The method also includes the steps of processing one or more gas streams containing carbon dioxide from the biomass power plant and the hydrogen production process in one or more carbon capture unit to reduce $CO_2e$ emissions and converting at least some of the waste heat to thermal energy for use in the commercial or industrial operations.

The method further comprises the step of converting at least some of the thermal energy to steam to power a mechanical drive for one or more motors generating shaft torque in the commercial operation. The thermal energy may also be used to produce hot water or steam for district heating in the commercial or industrial operations. The thermal energy may also be used to produce hot water or steam for an absorption chiller to provide chilling duty for district cooling in the commercial or industrial operations.

The commercial or industrial operations may comprise one or more greenhouses, and the thermal energy is used to heat the one or more greenhouses. In this embodiment, the method further comprises recovering carbon dioxide from the biomass power plant and the hydrogen production process, wherein the recovered carbon dioxide is used to supplement the $CO_2$ concentration of the air inside the one or more greenhouses.

The commercial or industrial operations may also comprise one or more algae farms, and the thermal energy is used to heat the one or more algae farms. In this embodiment, the method further comprises recovering carbon dioxide from the biomass power plant and the hydrogen production process, wherein the recovered carbon dioxide is used to enrich the $CO_2$ concentration of the sparging air in the one or more algae farms.

The method further comprises the step of providing at least some, and preferably substantially all of the required energy for the commercial or industrial operations from the biomass power plant.

DESCRIPTION OF FIGURES

The features and advantages of the present invention will be more clearly understood from the following description taken in conjunction with the accompanying drawings in which.

DETAILED DESCRIPTION OF THE INVENTION

The present invention relates to a method and process for the beneficial use of waste heat and/or carbon dioxide produced during the production of low, neutral and/or negative carbon intensity hydrogen.

In all embodiments of the present invention described herein, the low, neutral, and/or negative carbon intensity hydrogen is produced according to the teachings of co-owned U.S. application Ser. No. 18/117,606 (filed Mar. 6, 2023), which is incorporated by reference herein in its entirety. As discussed therein, at least some, and preferably substantially all, of the energy for the hydrogen production process is provided by the combustion or gasification of various forms of biomass to reduce the carbon intensity of the hydrogen product to preferably less than 1.0 kg $CO_2e$/kg $H_2$, more preferably less than 0.45 kg $CO_2e$/kg $H_2$, and most preferably less than 0.0 kg $CO_2e$/kg $H_2$.

Figure 1:
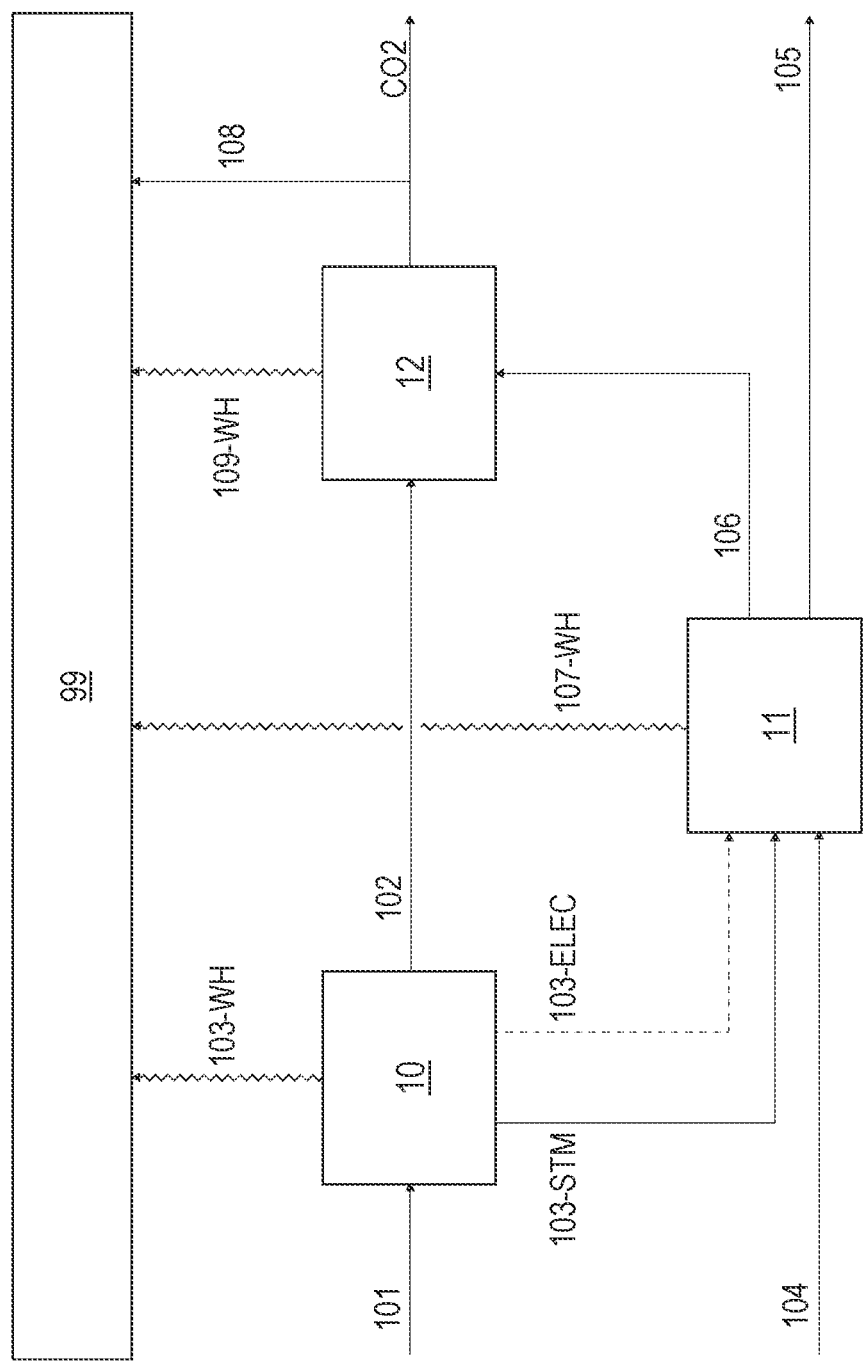
FIG. 1 depicts a process flow diagram in which waste heat from the production of low, neutral and/or negative carbon intensity hydrogen is used as a source of heat for a greenhouse.

With reference to FIG. 1, a first embodiment of the present invention is depicted, in which waste heat from the production of low, neutral and/or negative carbon intensity hydrogen is used as a source of thermal energy for providing heat to a greenhouse.

Biomass power plant 10 generates carbon negative energy in the form of electricity 103-ELEC and/or steam 103-STM. The energy produced from biomass power plant 10 is generated by either a Rankine cycle, a Brayton cycle, or an integrated gasification combined cycle (IGCC) which consists of both a Rankine cycle and Brayton cycle.

Where biomass power plant 10 comprises a Rankine cycle, energy is produced from the direct combustion of biomass feedstock 101 in a biomass boiler to generate steam 103-STM. The generated steam from the biomass power plant can be sent to a Rankine cycle steam turbine to produce electricity 103-ELEC. Furthermore, steam 103-STM can also be sent directly to hydrogen plant 11 or can be extracted from the turbine and sent to hydrogen plant 11.

Where biomass power plant 10 comprises a Brayton cycle, the biomass feedstock 101 is gasified to create a syngas product that is combusted as a fuel in a Brayton cycle gas turbine to produce electricity 103-ELEC.

Alternatively, biomass power plant 10 can be configured as an IGCC plant in which the biomass feedstock 101 is gasified to create a syngas product with or without steam generation. The syngas can be combusted as fuel in a Brayton cycle gas turbine to generate electricity 103-ELEC. Steam 103-STM can also be generated with a heat recovery steam generator (HRSG) on the gas turbine exhaust. This steam can be used in a Rankine cycle to generate additional electricity 103-ELEC. Steam 103-STM can also be used as process steam or as thermal energy in hydrogen plant 11. Additional uses of this carbon negative energy (103-ELEC and 103-STM) are discussed herein with respect to additional embodiments of the present invention.

Hydrocarbon feed 104 is reformed in hydrogen plant 11 by either autothermal reforming, steam reforming, or a combination of autothermal reforming and steam reforming to produce low, neutral, and/or negative carbon intensity hydrogen product 105. Although not shown in FIG. 1, hydrogen product 105 can be utilized to produce low, neutral, and/or negative carbon intensity hydrogen derivatives and/or hydrogen carriers, including but not limited to ammonia.

Carbon dioxide 102 is captured from the biomass power plant flue gas stream and carbon dioxide 106 is captured from the hydrogen plant syngas stream and/or flue gas stream. The carbon dioxide streams 102 and 106 can be compressed in $CO_2$ compression unit 12 and sent to geologic sequestration or otherwise used external to the process. In certain aspects of the present invention, carbon dioxide 108 can be used to supplement or enrich the $CO_2$ concentration of the air inside greenhouse 99. Although not shown, carbon dioxide 108 can also be used to enrich the air used to cultivate algae.

According to certain aspects of the present invention, greenhouse 99 can be heated from sources of thermal energy generated from the production of low, neutral and/or negative carbon intensity hydrogen. Waste heat 103-WH, 107-WH, and 109-WH generated from biomass power plant 10, hydrogen plant 11, and $CO_2$ compression unit 12, respectively, can be converted to thermal energy used for heating greenhouse 99. The sources of waste heat that can be used for thermal energy are discussed in more detail below with respect to specific embodiments of the present invention.

Figure 2:
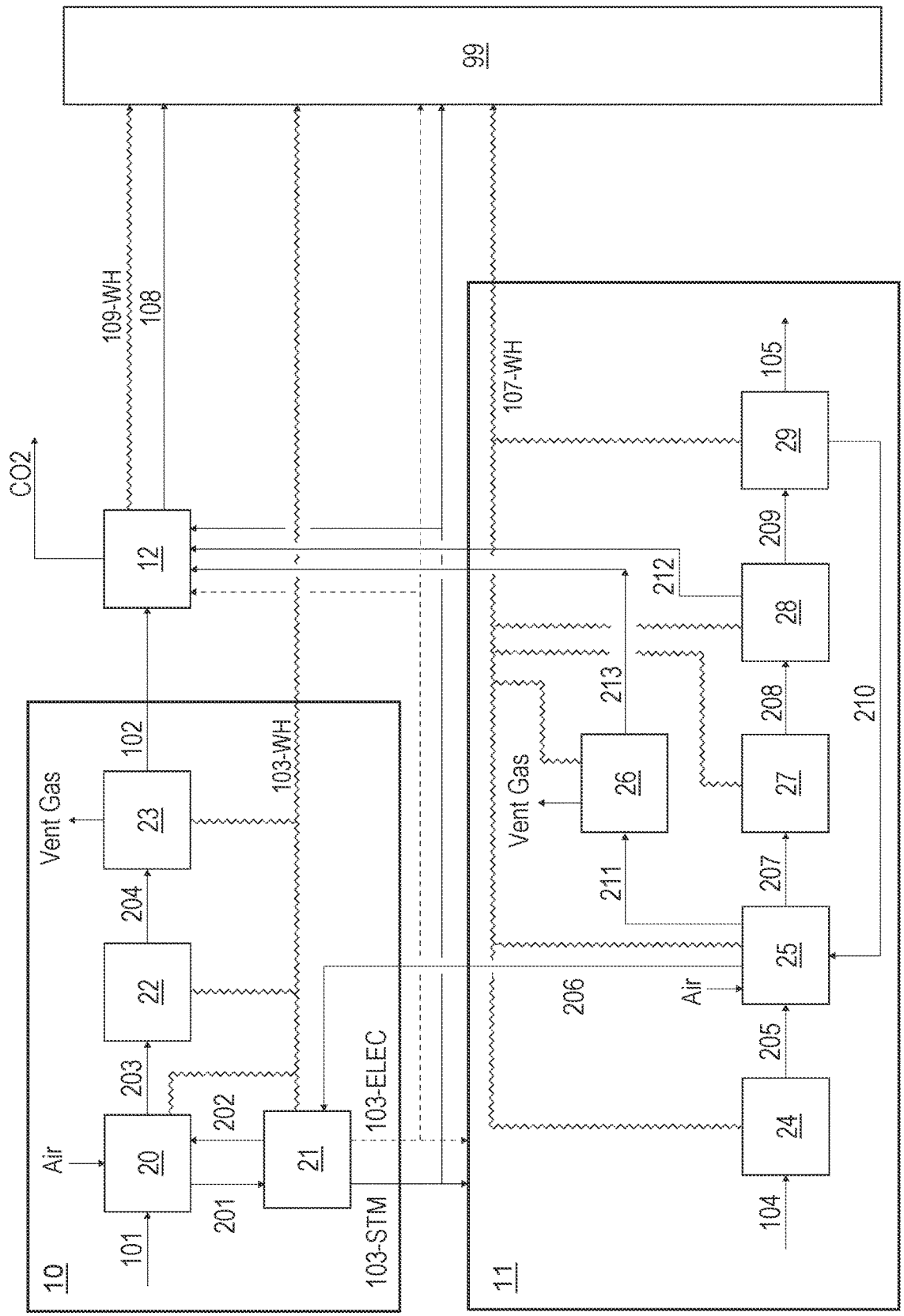
FIG. 2 depicts a process flow diagram for the process of FIG. 1 in which electricity and heat for a greenhouse are provided from the production of hydrogen utilizing steam methane reforming and captured carbon dioxide from the hydrogen production process is utilized to increase the $CO_2$ concentration of the air inside the greenhouse.

In a second embodiment of the present invention, FIG. 2 illustrates greenhouse 99 utilizing waste heat from biomass power plant 10 and hydrogen plant 11 as sources of thermal energy.

Biomass power plant 10 is depicted as a Rankine cycle power plant. Biomass feedstock 101 is combusted in boiler 20 to produce steam 201 that can be sent to steam turbine 21 to generate electricity 103-ELEC for greenhouse 99. Steam 103-STM can be extracted from steam turbine 21 to provide a source of thermal energy for greenhouse 99 heating requirements and/or power the mechanical drive for pumps, heat pumps, and/or fans. Not shown in FIG. 2, steam 201 can also be sent directly to greenhouse 99 for use as thermal energy and/or to power the mechanical drives. Furthermore, electricity 103-ELEC and steam 103-STM can also be sent to hydrogen plant 11 and/or $CO_2$ compression unit 12.

Flue gas 203 from boiler 20 is sent through air quality control system 22, where it passes through several, optional emissions reduction technologies. The treated flue gas 204 is then sent to post combustion capture (PCC) unit 23 where carbon dioxide 102 is separated from the flue gas. Flue gas 203 and treated flue gas 204 can both be utilized as sources of thermal energy for waste heat 103-WH, which can then be used for heating greenhouse 99.

Hydrogen plant 11 is shown as a steam methane reformer (SMR). Hydrocarbon feed 104 passes through feed purification 24 to remove any contaminants prior to entering reformer 25. As is well known, the endothermic, catalytic SMR reaction in which steam and hydrocarbons, mainly methane, are converted to syngas, which consists primarily of carbon monoxide and hydrogen, takes place in reformer 25. Syngas 207 generated by the SMR, which operates at elevated temperatures due to the steam methane reforming reaction, can be utilized as a source of thermal energy for waste heat 107-WH, which can then be used for heating greenhouse 99.

Syngas 207 is sent to the water-gas shift (WGS) reactor system 27 where carbon monoxide and water in the syngas 207 undergo a WGS reaction to form carbon dioxide and hydrogen. Syngas carbon capture unit 28 separates hydrogen 209 and carbon dioxide 212. Hydrogen 209 is sent to purification unit 29, to remove trace amounts of impurities and produce hydrogen product 105. Tail gas/reject gas 210 from purification unit 29, consisting mostly of hydrogen, is recycled to reformer 25 and can be used for combustion.

Fuel gas, in the presence of air, is combusted to drive the endothermic, SMR reaction in reformer 25. The heat of combustion in flue gas 211 can be converted to make steam 206 from boiler feed water. Steam 206 can be sent to steam turbine 21 at biomass power plant 10 or can then be sent to a separate steam turbine located in hydrogen plant 11 to generate additional electricity to power greenhouse 99. Alternatively, steam 206 can also be sent directly to greenhouse 99 for use as thermal energy and/or power the mechanical drive for pumps, heat pumps, and/or fans.

Flue gas 211 can be sent to PCC unit 26 where carbon dioxide 213 is separated from the flue gas. Flue gas 211 can be utilized as a source of thermal energy for waste heat 107-WH, which can then be used for heating greenhouse 99.

Carbon dioxide 102, carbon dioxide 212, and carbon dioxide 213 can be compressed in $CO_2$ compression unit 12 for geologic sequestration or can be used external to the process. Carbon dioxide 108 can be used to enrich the air inside greenhouse 99 to optimize and increase plant growth.

The heat of compression in $CO_2$ compression unit 12 can be utilized as a source of thermal energy for waste heat 109-WH, which can be used for heating greenhouse 99.

The biomass power plant 10, hydrogen plant 11, and $CO_2$ compression unit 12 use cooling water and/or air-cooled heat exchangers to provide a means of cooling to the process. In these applications, the heat generated by the system is rejected to the atmosphere by evaporative cooling towers, air-cooled fans (e.g. dry cooling systems), or a combination thereof. Although not shown in FIG. 2, the cooling water return could be used as a source of thermal energy used for heating greenhouse 99.

Depending on the configuration, greenhouse 99 is typically heated by either central or local heating systems. Central heating systems consist of a fired boiler that produces and distributes either hot water or steam throughout the greenhouse, whereas local heating systems transfer heat from the combustion of a fuel to the nearby surrounding air through forced-air heat exchangers or through the flue gas piping. Steam from biomass plant 10 and/or hydrogen plant 11 can be used to provide central or local heating to greenhouse 99. Thermal energy from 103-WH, 107-WH and/or 109-WH can also be utilized to provide heating to greenhouse 99.

Figure 3:
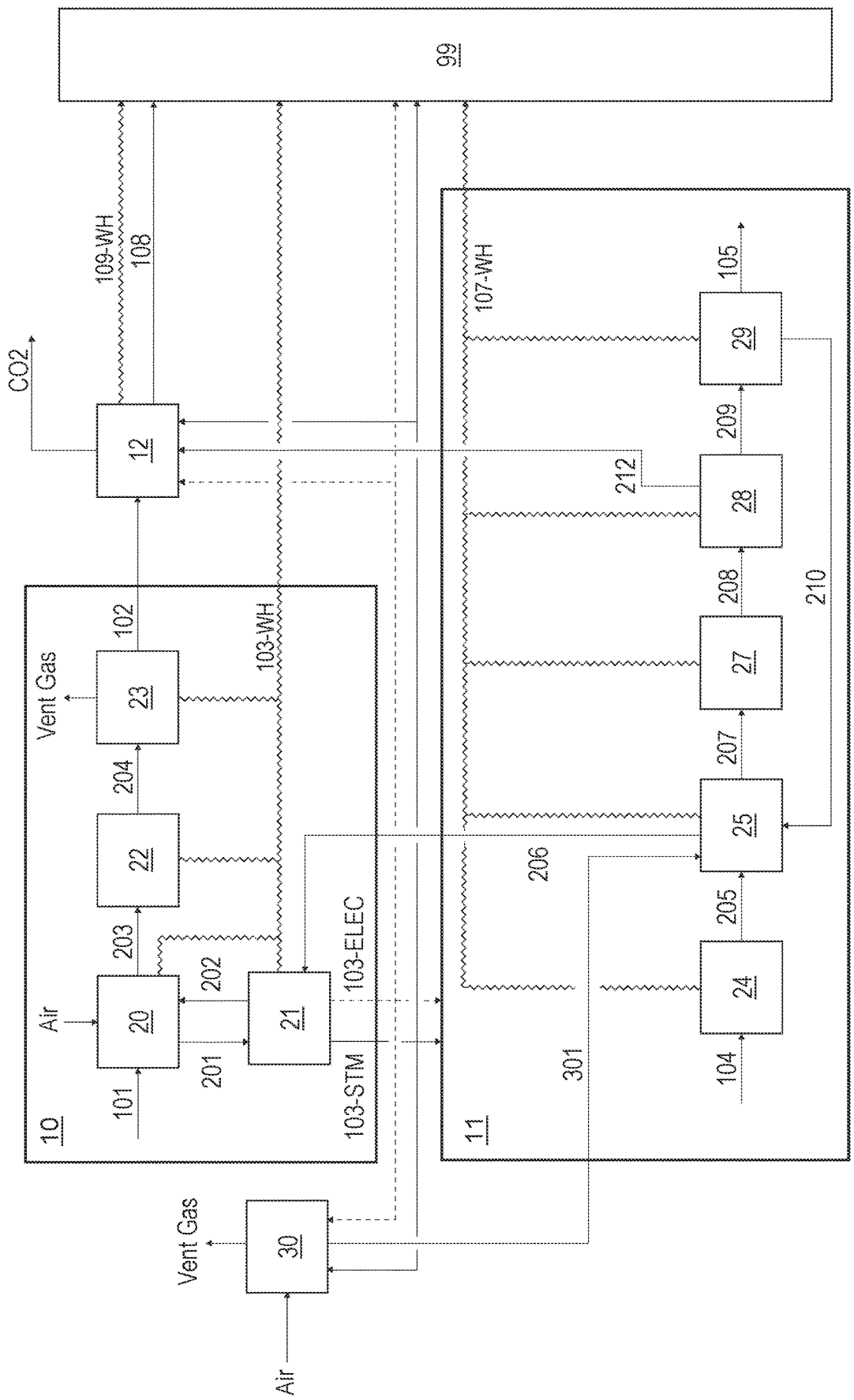
FIG. 3 depicts a process flow diagram for the process of FIG. 1 in which electricity and heat for a greenhouse are provided from the production of hydrogen utilizing autothermal reforming and captured carbon dioxide is utilized to increase the $CO_2$ concentration of the air inside the greenhouse.

In a third embodiment of the present invention, FIG. 3 illustrates the use of auto-thermal reforming (ATR) instead of steam methane reforming as shown in FIG. 2. An ATR differs from an SMR in how heat is supplied to the reforming reaction. An ATR is a combination of the endothermic steam methane reforming reaction and the exothermic partial oxidation (PDX) reaction. The heat produced by the PDX reaction is used in the steam methane reforming reaction to generate syngas.

FIG. 3 differs from FIG. 2 in the configuration of reformer 25. Treated hydrocarbon feed 205 is preheated prior to reforming. There are multiple options for preheating treated hydrocarbon feed 205, including but not limited to a fired preheater and/or a gas heated reformer (GHR). The flue gas from the fired heater could either be vented to atmosphere or be sent to a PCC unit depending on the desired carbon capture recovery. Where the configuration includes a stand-alone GHR, it is well understood that no flue gas would be generated.

In reformer 25 the preheated and treated hydrocarbon feed is partially oxidized in reformer 25, in the presence of high purity oxygen 301 from air separation unit (ASU) 30.

Sources of thermal energy and waste heat that can be utilized to provide heating to greenhouse 99 are the same for FIG. 3 as was described with respect to FIG. 2. However, although not depicted, waste heat from ASU 30 can also be used as a source of thermal energy to provide heating to greenhouse 99.

Also similar to FIG. 2, carbon dioxide 108 can be used to enrich the air inside greenhouse 99 to optimize and increase plant growth.

In a fourth embodiment of the present invention, a method for providing energy to commercial or industrial operations is provided. The method includes the step of recovering waste heat from a hydrogen production process, wherein the hydrogen product has a carbon intensity preferably less than about 1.0 kg $CO_2$e/kg $H_2$, more preferably less than about 0.45 kg $CO_2$e/kg $H_2$, and most preferably less than about 0.0 kg $CO_2$e/kg $H_2$. The hydrogen is preferably produced by converting a hydrocarbon feedstock to hydrogen through a reforming process, wherein at least some, and preferably substantially all, of the required energy for the hydrogen production process is provided from a biomass power plant. The energy produced by the biomass power plant is selected from one or more of:

(a) electricity generated from work produced by a Rankine cycle, Brayton cycle, or integrated gasification combine cycle;
(b) steam that can be used as process steam in the hydrogen production process;
(c) steam that can be used as thermal energy; or
(d) steam that can be used to power a mechanical drive.

The method also includes the steps of processing one or more gas streams containing carbon dioxide from the biomass power plant and the hydrogen production process in one or more carbon capture unit to reduce $CO_2$e emissions, and converting at least some of the waste heat to thermal energy for use in the commercial or industrial operations.

The method further comprises the step of converting at least some of the thermal energy to steam to power a mechanical drive for one or more motors generating shaft torque in the commercial operation. The thermal energy may also be used to produce hot water or steam for district heating in the commercial or industrial operations. The thermal energy may also be used to produce hot water or steam for an absorption chiller to provide chilling duty for district cooling in the commercial or industrial operations.

The commercial or industrial operations may comprise one or more greenhouses, and the thermal energy is used to heat the one or more greenhouses. In this embodiment, the method further comprises recovering carbon dioxide from the biomass power plant and the hydrogen production process, wherein the recovered carbon dioxide is used to supplement the $CO_2$ concentration of the air inside the one or more greenhouses.

The commercial or industrial operations may also comprise one or more algae farms, and the thermal energy is used to heat the one or more algae farms. In this embodiment, the method further comprises recovering carbon dioxide from the biomass power plant and the hydrogen production process, wherein the recovered carbon dioxide is used to enrich the $CO_2$ concentration of the sparging air in the one or more algae farms.

The method further comprises the step of providing at least some, and preferably substantially all of the required energy for the commercial or industrial operations from the biomass power plant.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and spirit of the present invention.

What is claimed is:

1. A method for providing energy to commercial or industrial operations, comprising:
   recovering waste heat from a hydrogen production process, wherein the hydrogen product has a carbon intensity less than about 1.0 kg $CO_2$e/kg $H_2$; wherein the hydrogen is produced by converting a hydrocarbon feedstock to hydrogen through a reforming process, wherein at least some of the required energy for the hydrogen production process is provided from a biomass power plant comprising the direct combustion of a biomass feedstock; wherein the energy produced by the biomass power plant is selected from one or more of:
   (a) electricity generated from work produced by a Rankine cycle or Brayton cycle;
   (b) steam that can be used as process steam in the hydrogen production process;
   (c) steam that can be used as thermal energy; or
   (d) steam that can be used to power a mechanical drive; and
   processing one or more gas streams containing carbon dioxide from the biomass power plant and the hydrogen production process in one or more carbon capture unit to reduce $CO_2$e emissions;
   converting at least some of the waste heat to thermal energy for use in the commercial or industrial operations.

2. The method of claim 1, further comprising converting at least some of the thermal energy to steam to power a mechanical drive for one or more motors generating shaft torque in the commercial operation.

3. The method of claim 1, wherein the thermal energy is used to produce hot water or steam for district heating in the commercial or industrial operations.

4. The method of claim 1, wherein the thermal energy is used to produce hot water or steam for an absorption chiller to provide chilling duty for district cooling in the commercial or industrial operations.

5. The method of claim 1, wherein the commercial or industrial operations comprises one or more greenhouses, and the thermal energy is used to heat the one or more greenhouses.

6. The method of claim 5, further comprising recovering carbon dioxide from the biomass power plant and the hydrogen production process, wherein the recovered carbon dioxide is used to supplement the $CO_2$ concentration of the air inside the one or more greenhouses.

7. The method of claim 1, wherein the commercial or industrial operations comprises one or more algae farms, and the thermal energy is used to heat the one or more algae farms.

8. The method of claim 7, further comprising recovering carbon dioxide from the biomass power plant and the hydrogen production process, wherein the recovered carbon dioxide is used to enrich the $CO_2$ concentration of the sparging air in the one or more algae farms.

9. The method of claim 1, wherein the hydrogen product has a carbon intensity less than about 0.45 kg $CO_2$e/kg $H_2$.

10. The method of claim 1, wherein the hydrogen product has a carbon intensity less than about 0.0 kg $CO_2$e/kg $H_2$.

11. The method of claim 1, wherein substantially all of the required energy for the hydrogen production process is provided from the biomass power plant.

12. The method of claim 1, further comprising providing at least some of the required energy for the commercial or industrial operations from the biomass power plant.

* * * * *